(12) United States Patent
Hourticolon et al.

(10) Patent No.: US 6,699,443 B1
(45) Date of Patent: Mar. 2, 2004

(54) LIQUID DISTRIBUTOR WITH CLEANING MECHANISM

(75) Inventors: Roland Hourticolon, Leichlingen (DE); Reinhard Eltner, Duesseldorf (DE); Juergen Latzel, Wuppertal (DE); Gerd Goebel, Cologne (DE); Petro Mendia, Alsdorf (DE); Axel Geisler, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 337 days.

(21) Appl. No.: 09/154,130

(22) Filed: Sep. 16, 1998

Related U.S. Application Data

(63) Continuation of application No. 08/667,061, filed on Jun. 20, 1996, now abandoned.
(60) Provisional application No. 60/000,643, filed on Jun. 29, 1995.

(51) Int. Cl.$^7$ ................. B01J 8/08; B01J 8/18
(52) U.S. Cl. ............... 422/220; 422/219; 422/311; 137/237
(58) Field of Search ............... 15/104.3, 104.5, 15/246, 246.05; 137/237; 422/219, 311, 220, 194

(56) References Cited

U.S. PATENT DOCUMENTS

| 4,182,741 A | * | 1/1980 | Carson et al. ............. 422/211 |
| 4,569,364 A | * | 2/1986 | Keller et al. ............. 137/244 |
| 4,669,890 A | * | 6/1987 | Peyrot ................. 366/341 |
| 4,836,989 A | * | 6/1989 | Aly et al. .............. 422/195 |
| 5,484,578 A | * | 1/1996 | Muldowney et al. ....... 422/220 |

* cited by examiner

Primary Examiner—Jerry D. Johnson
Assistant Examiner—Alexa A. Doroshenk
(74) Attorney, Agent, or Firm—John E. Drach

(57) ABSTRACT

A liquid distributor, for a substantially vertical reactor with a fixed bed catalyst, in the form of a channel distributor with drainage outlets and further comprising an internal cleaning mechanism with cleaning elements to be lowered into the openings of the drainage outlets, is disclosed.

10 Claims, 6 Drawing Sheets

LIQUID DISTRIBUTOR WITH CLEANING MECHANISM

BENEFIT OF EARLIER FILING DATE UNDER 37 CFR 1.78(A)(4)

This application is a continuation of Ser. No. 08/667,061, filed Jun. 20, 1996, now abandoned and claims the benefit of earlier filed and provisional application Ser. No. 60/000,643 filed on Jun. 29, 1995.

BACKGROUND OF THE INVENTION

1. Field of the Invention

This invention relates to a liquid distributor, preferably for a substantially vertical reactor containing a fixed catalyst bed, more particularly a tube-bundle reactor, the distributor being in the form of a channel distributor with drainage outlets.

2. Description of the Related Art

Liquid distributors of the type in question are used for material and heat exchange columns on the one hand and for reactors on the other hand and are intended to distribute the liquid over the packings or fixed beds arranged in the columns or reactors. In both cases, an important requirement is uniformity of distribution over the entire cross-section of the reactor or column independently of the load and a possible sloping position. More particularly, the efficiency of industrial trickle-bed reactors is influenced by the liquid distribution system. A uniform distribution of the liquid over the cross-section of the reactor guarantees adequate contact between the catalyst and the liquid phase and is therefore critical to the optimal operation of the reactor. If the volume of liquid is locally reduced by uneven distribution, performance is affected and has to be restored by an increase in temperature. However, this measure leads to losses of selectivity, to residue formation, to deposits and to caking of the catalyst. The outcome of this is failure of part of the catalyst packing. Since, in this case, the pressure loss in the packing increases beyond permitted limits despite high activity, the service life of the catalyst is reduced. Tube-bundle reactors in particular require a highly uniform distribution of the liquid to the individual tubes because any low-load regions are far more difficult to compensate with more heavily loaded regions than in shaft reactors.

One of the main causes of uneven liquid distribution is the blockage of the drainage outlets by soil present in the liquid. Other causes are the different distances of the drainage outlets from the point of introduction of the liquid, non-horizontal alignment of the distributor and variations as a function of time both in pressure and in the liquid flow rate on entry.

The problem addressed by the present invention was to provide a liquid distributor of the type mentioned at the beginning in which the uniformity of distribution of the liquid would be largely unaffected by the factors mentioned.

SUMMARY OF THE INVENTION

According to the invention, the solution to this problem is characterized by a cleaning arrangement with cleaning elements, more particularly pins, designed to be lowered into the opening of the drainage outlets. According to the invention, therefore, deposits and incrustations on the inside of the openings are mechanically removed from the drainage outlets. More particularly, one pin is associated with each opening.

Even if the pins are not exactly aligned, cleaning can still be carried out providing the pins are suspended from springs, more particularly helical springs.

Actuation of the pins is simplified if the pins are fixed to a holder which is designed for vertical displacement in a guide. Through the vertical displacement of the holder, all the pins can be simultaneously lowered into and also removed from the openings of the drainage outlets.

At rest, the holder should remain in an upper position. Accordingly, one particular embodiment of the invention is characterized by the provision of at least one spring element, which keeps the holder in an upper position, and an actuating element for depressing the holder. Accordingly, the cleaning arrangement need only be driven during the cleaning process. The rest position is automatically assumed between two cleaning operations.

To guarantee particularly trouble-free operation of the cleaning arrangement, the position and spring constant of the spring elements are coordinated so that, even if the holder is unevenly depressed, it does not jam in the guide.

The actuating element is preferably pneumatically driven. In this case, the holder with the cleaning pins is forced downwards when air is admitted and returns automatically to its rest position on venting.

In one particular embodiment of the invention, the cleaning arrangement is positioned inside the distributor and is designed to withstand high pressures. Accordingly, the cleaning operation can be carried out under pressure as often as required without any break in operation.

EXAMPLES

Examples of embodiment of the invention are described in detail in is the following with reference to the drawings.

Figure 1:
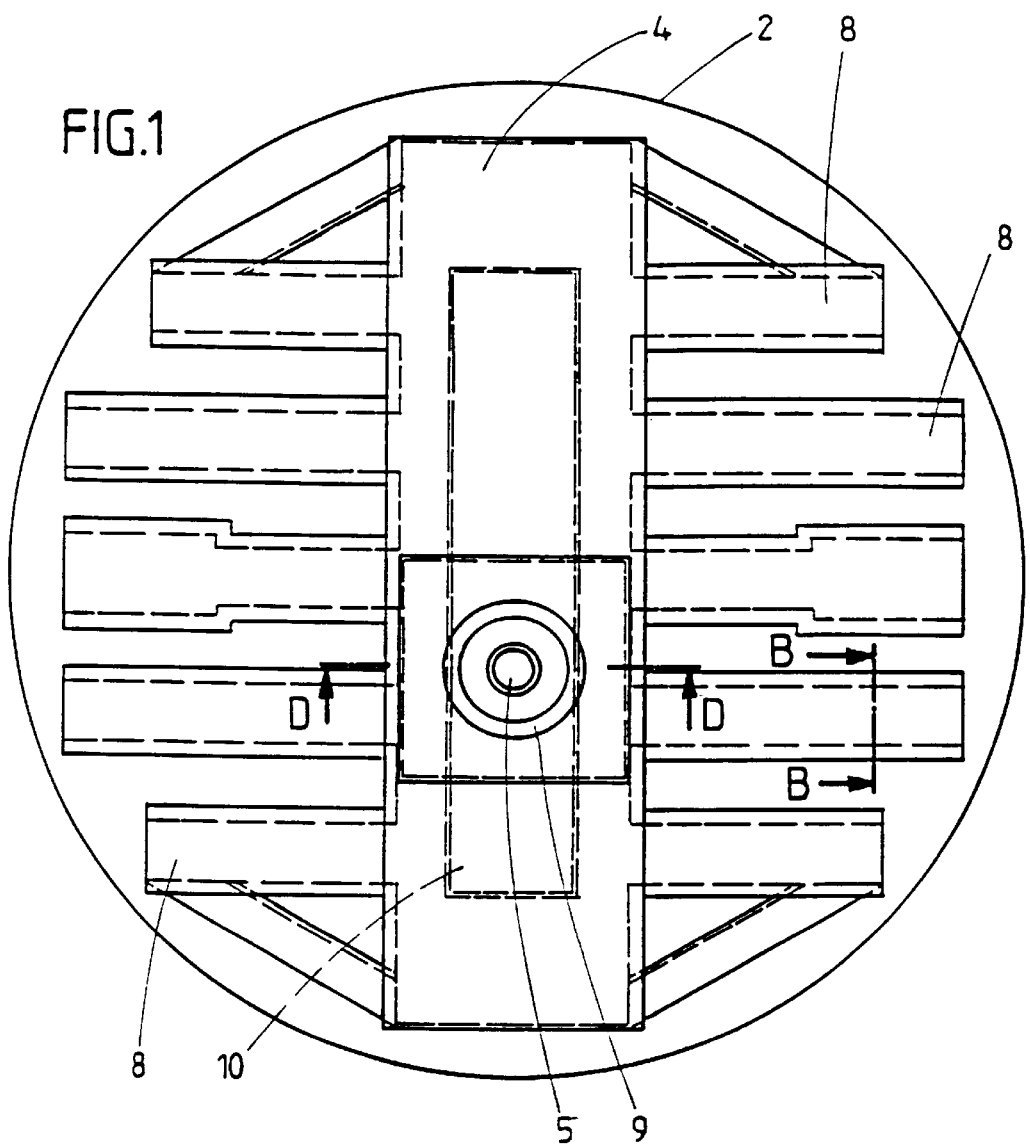
FIG. 1 depicts a distributor suitable for the installation of the cleaning arrangement according to the invention.

The distributor shown in FIG. 1 is installed in a reactor with an inner wall (2). The channel distributor consists of a main channel (4) with side channels (8) connected thereto. The liquid feed pipe (9) on the preliminary distributor (10) fitted into the main channel (4) and an actuating rod (5) for the cleaning arrangement described below are also shown.

Figure 2:
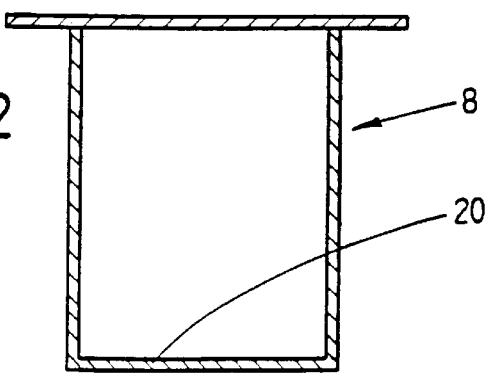
FIG. 2 is a view on the line B—B of FIG. 1.

FIG. 2 is a view on the line B—B of the side channel (8) shown in FIG. 1 with the bottom (20) of the distributor.

Figure 3:
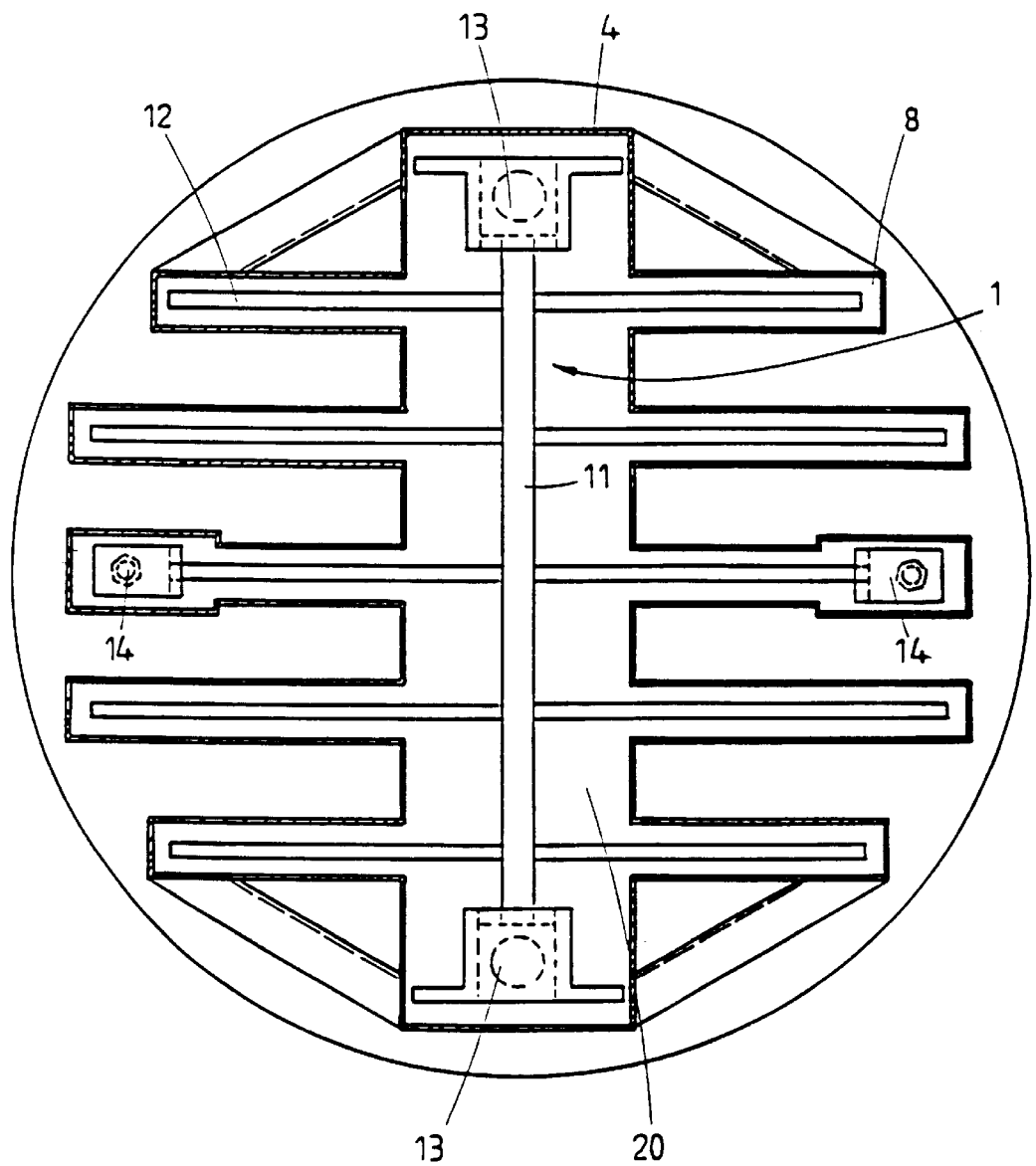
FIG. 3 shows the position of the holder (1) inside the distributor according to FIG. 1, as seen from above.
Figure 4:
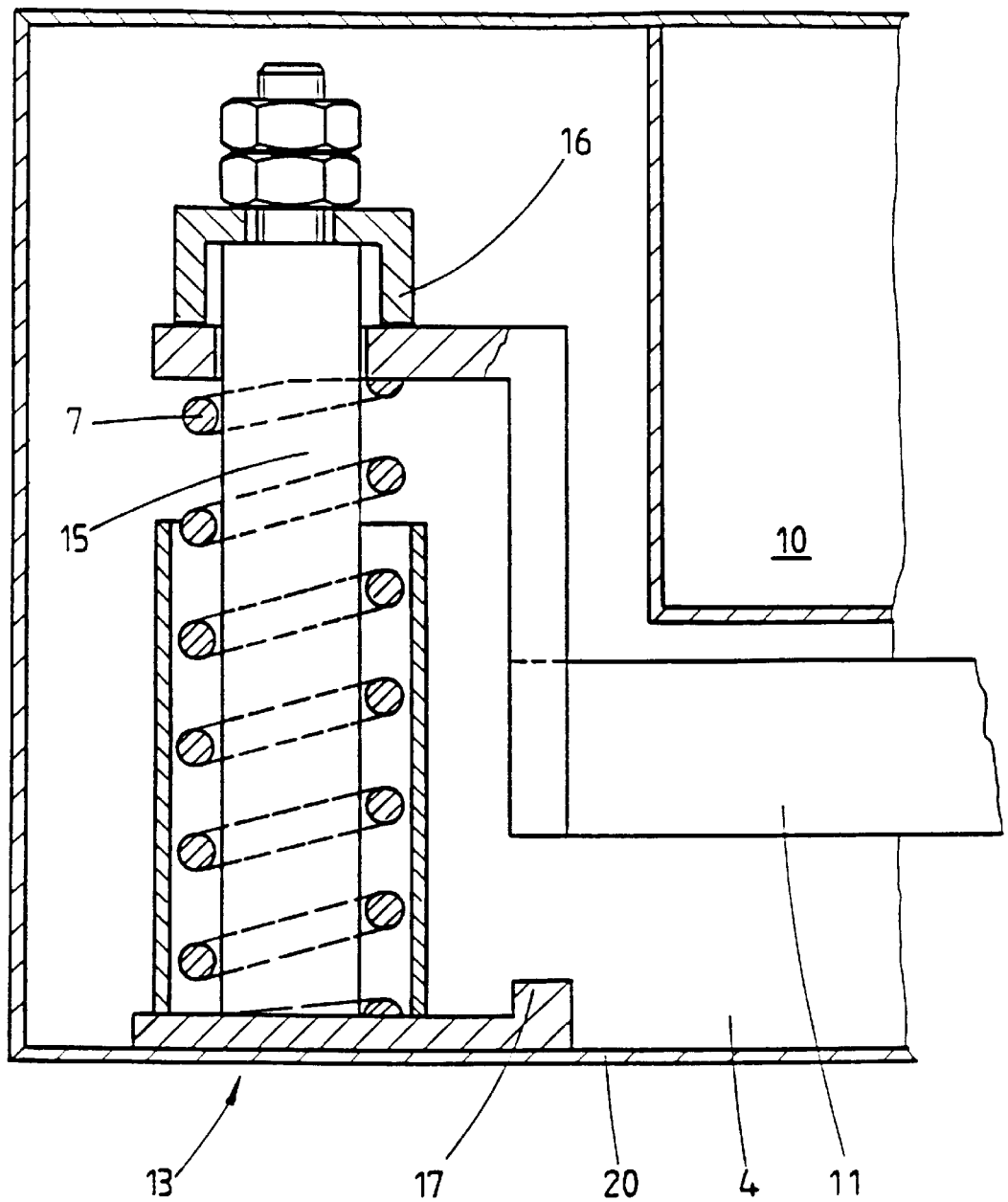
FIG. 4 shows one of the guides (13) of the holder according to FIG. 3.
Figure 5:
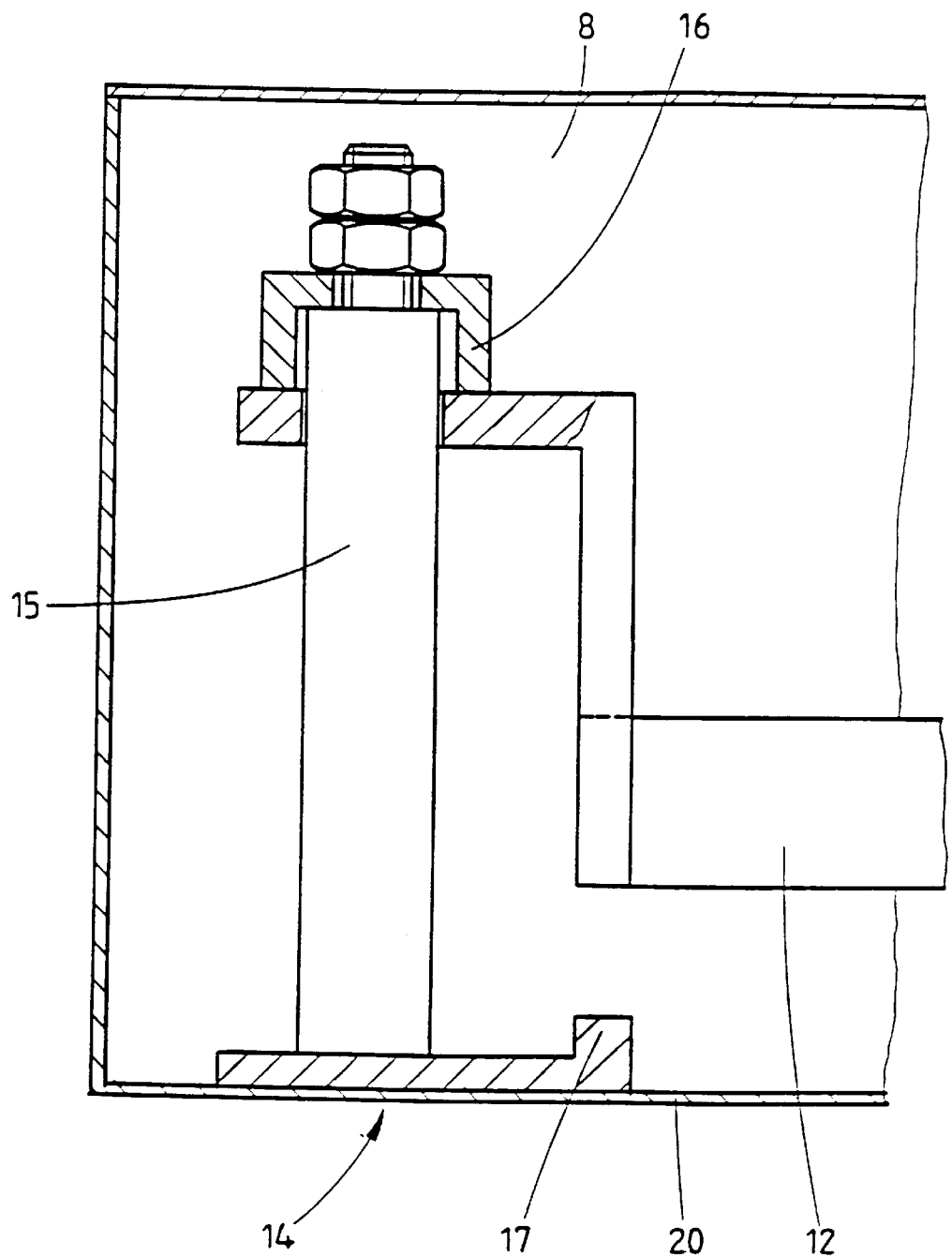
FIG. 5 shows one of the guides (14) of the holder according to FIG. 3.
Figure 6:
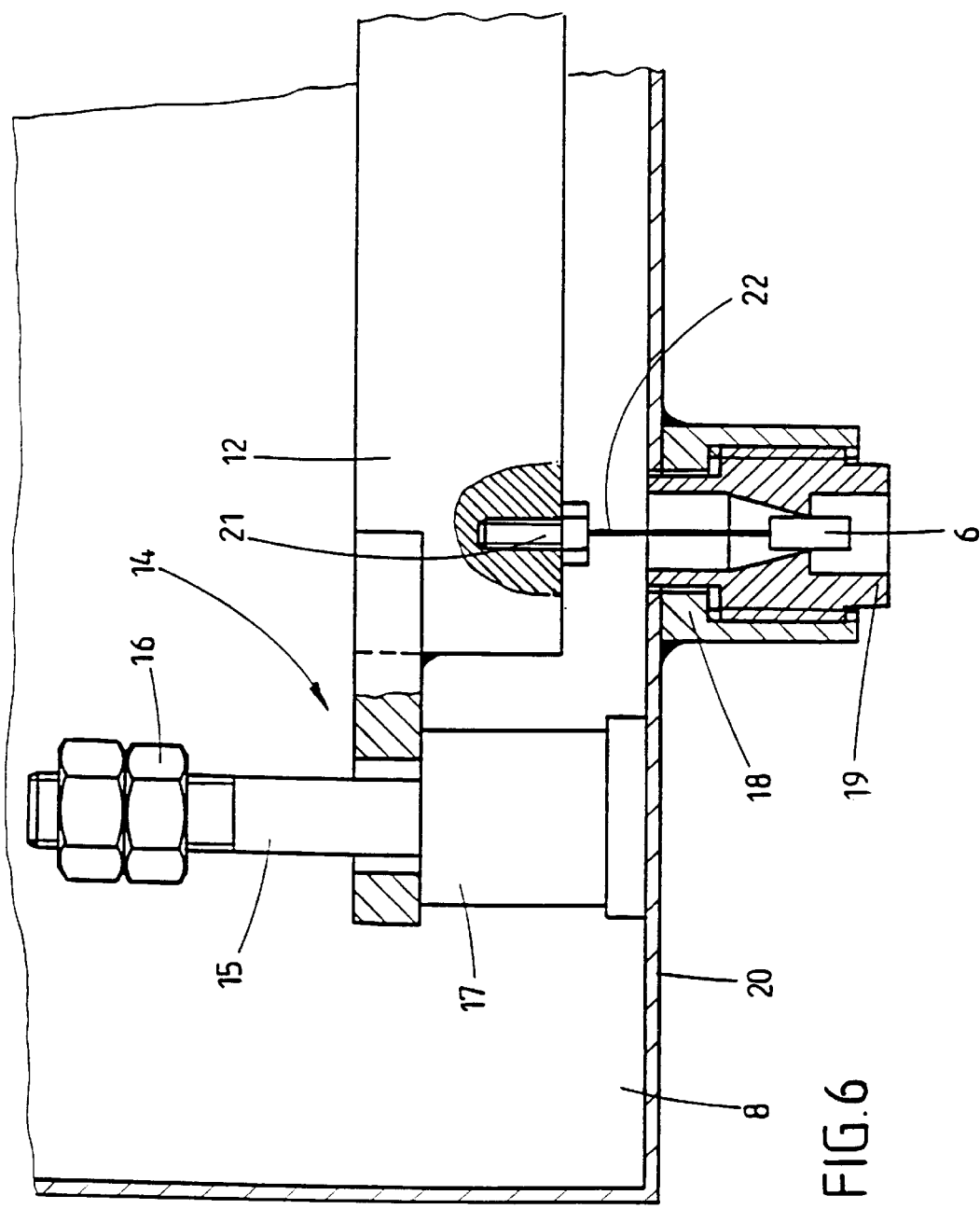
FIG. 6 shows an alternative guide (14) of the holder.

The position of the holder (1) of one example of embodiment of the cleaning arrangement according to the invention inside the distributor is shown in FIG. 3. The holder (1) consists of a main support (11) arranged in the main channel (4) with lateral supports (12) fixed thereto along and inside the side channels (8). The holder (1) has four guides, namely two guides (13) shown in section in FIG. 4 and two guides (14) shown in section in FIG. 5. As shown in FIG. 4, the ends of the main support (11) are mounted for vertical displacement on bolts (15), a spring element (7), namely a compression spring, holding the main support (11) in an upper position, the rest position. The two guides for the middle lateral support (12), which are each installed in a side channel, are constructed in the same way, but do not have any spring elements. An alternative embodiment of the guide (14) is shown in FIG. 6. With all the guides, the vertical displacement of the holder (1) is limited by an upper stop (16) and a lower stop (17). By means of the guides (13), (14), the holder (1) is guided—by virtue of the special coordination of the springs (7)—in such a way that even extremely uneven depression of the holder (1) does not result in jamming in the guides.

FIG. 6 is a section through a drainage outlet. Welded onto the bottom (20) of the distributor is a sleeve (18) with an internal screwthread into which the nozzle (19) is screwed. Secured above each nozzle in the holder (1) is a screw (21) from which a pin (6) is suspended via a helical spring (22). The diameter of the pin (6) is such that it passes through the nozzle (19). FIG. 6 shows the holder (1) in the lower position, the working position, in which the pin (6) is guided through the nozzle (19).

Figure 7:
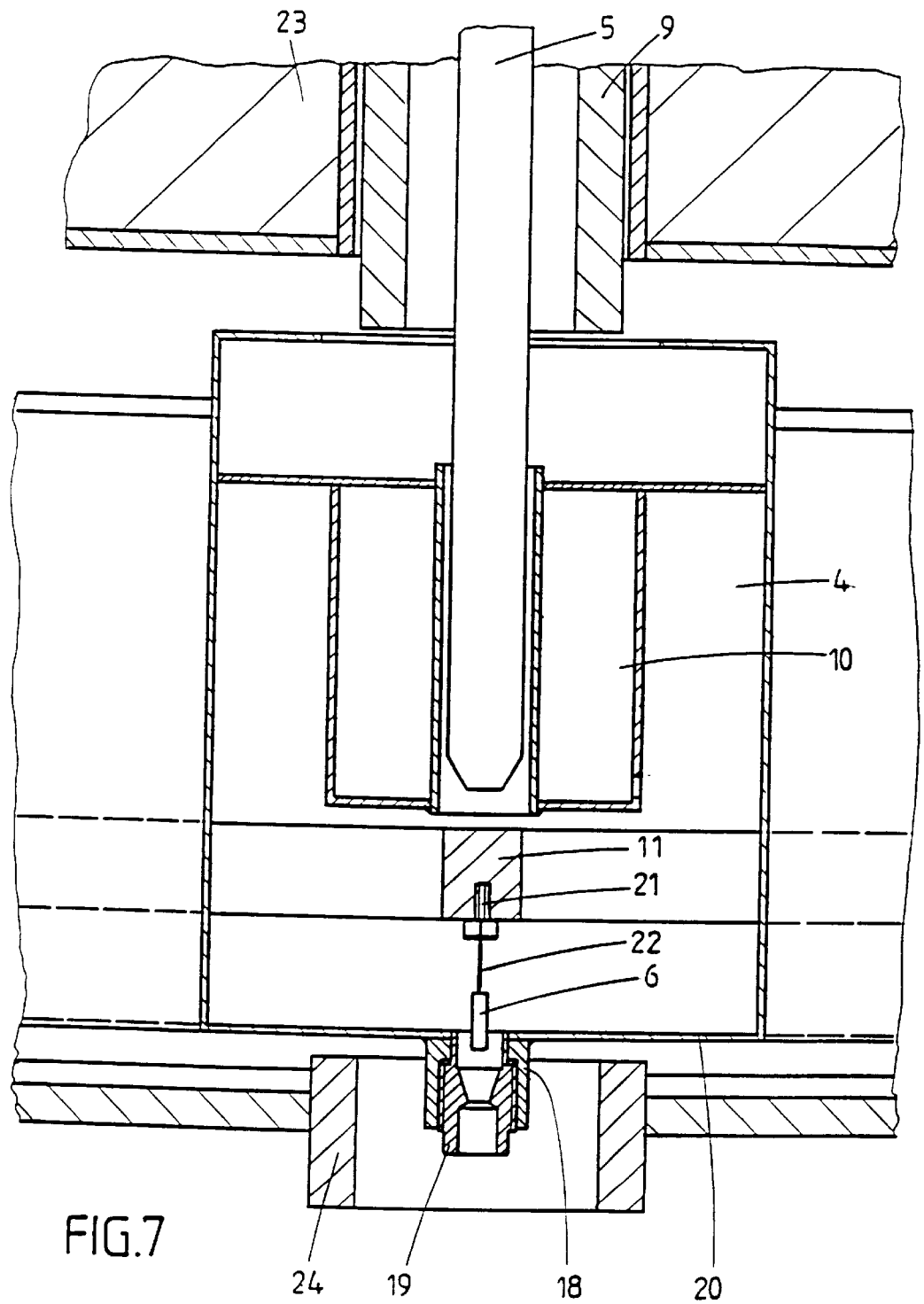
FIG. 7 is a view on the line D—D of FIG. 1.

FIG. 7 shows the cleaning arrangement in the upper position, the rest position of the holder (1). In the same way as before, the same elements are denoted by the same reference numerals. FIG. 7 also shows the reactor cover (23), through which the liquid feed pipe 9 and the actuating rod (5) are guided, and one of the reactor tubes (24) above each of which a nozzle (19) is arranged. By means of the actuating rod (5), the holder (1) is pressed from its upper position into the lower (working) position.

The cleaning arrangement operates as follows:

At rest, the holder (1) is held in the upper position by the two springs (7). If a cleaning operation is to be carried out, the actuating rod is pressed downwards by actuating the upper part of a high-pressure valve (not shown), so that the holder (1) is also brought into the lower position. During this downward movement of the holder (1), the spring-mounted pins (6) are pressed into the corresponding nozzle (19) so that any soil particles are pressed downwards from the nozzle bore into the underlying reaction zone. On completion of cleaning, the actuating rod (5) is raised again by venting the upper part of the high-pressure valve. The springs (7) then press the holder (1) back into its rest position. This operation can be repeated as often as required. Since the pressure-carrying parts, including the upper part of the control valve, are preferably designed to withstand high pressures, the cleaning process may even be carried out under pressure without any break in operation.

LIST OF REFERENCE NUMERALS 1 holder
2 inner wall
3 opening
4 main channel
5 actuating element, actuating rod
6 pin
7 spring element
8 side channel
9 liquid feed pipe
10 preliminary distributor
11 main support
12 lateral support
13 guide (FIG. 4)
14 guide (FIG. 5)
15 bolt
16 upper stop
17 lower stop
18 sleeve
19 nozzle
20 bottom of the distributor
21 screw
22 helical spring
23 reactor cover
24 reactor tube

What is claimed is:

1. A liquid distributor for use inside a substantially vertical reactor containing a fixed bed catalyst wherein the liquid distributor is in the form of a channel distributor containing a main channel with side channels connected thereto and further comprising at least one drainage outlet, a liquid feed pipe fitted into said main channel, and a cleaning mechanism comprising a holder contained within a guide for vertical displacement, wherein the holder consists of a main support positioned in said main channel, lateral supports attached to the main support and extending inside said side channels, and at least one cleaning element capable of being lowered into the opening or openings of the at least one drainage outlet.

2. The distributor of claim 1 wherein said cleaning element is a pin.

3. The distributor of claim 1 wherein said cleaning element is suspended from said holder by a spring.

4. The distributor of claim 3 wherein an additional spring retains said holder and cleaning element in an upper position, relative to the distributor drainage outlet, and an actuating device depresses said holder and cleaning element, whereby said cleaning element is lowered into said drainage outlet.

5. The distributor of claim 4 wherein said actuating device is pneumatically driven.

6. The distributor of claim 4 wherein the position and spring constant of said springs are coordinated such that said holder and cleaning element will not jam within said guide under uneven depression.

7. A substantially vertical reactor containing a fixed bed catalyst and a liquid distributor positioned in the reactor, wherein the liquid distributor is in the form of a channel distributor containing a main channel with side channels connected thereto and further comprising at least one drainage outlet, a liquid feed pipe fitted into said main channel, and a cleaning mechanism comprising a holder contained within a guide for vertical displacement, wherein the holder consists of a main support positioned in said main channel; lateral supports attached to the main support and extending inside said side channels, and at least one cleaning element capable of being lowered into the opening or openings of the at least one drainage outlet.

8. A liquid distributor adapted for use inside a substantially vertical reactor containing a fixed bed catalyst wherein the liquid distributor is in the form of a channel distributor comprising a drainage outlet and having a cleaning mechanism comprising a cleaning element which can be lowered into the opening of said drainage outlet, and wherein the cleaning element is attached to a holder, said holder contained within a guide for vertical displacement.

9. A substantially vertical reactor containing a fixed bed catalyst and a liquid distributor positioned in the reactor, and adapted for use therein wherein the liquid distributor is in the form of a channel distributor comprising a drainage outlet and having a cleaning mechanism comprising a cleaning element which can be lowered into the opening of said drainage outlet, and wherein the cleaning element is attached to a holder, said holder being contained within a guide for vertical displacement.

10. A liquid distributor adapted for use inside a substantially vertical reactor containing a fixed bed catalyst wherein said distributor is designed to be positioned in the reactor and said distributor is in the form of a channel distributor containing a drainage outlet and a cleaning mechanism containing at least one pin for cleaning the drainage outlet.

* * * * *